United States Patent
Droege

(10) Patent No.: US 6,928,132 B2
(45) Date of Patent: Aug. 9, 2005

(54) METHODS AND APPARATUS FOR OPERATING A SYSTEM

(75) Inventor: Robert W. Droege, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,376

(22) Filed: Dec. 19, 2001

(65) Prior Publication Data
US 2003/0112917 A1 Jun. 19, 2003

(51) Int. Cl.[7] ............................................. G21C 17/00
(52) U.S. Cl. ...................... 376/245; 376/215; 376/216; 376/217; 376/259; 326/9; 326/14; 326/37
(58) Field of Search ................................ 376/215–217, 376/245, 259

(56) References Cited

U.S. PATENT DOCUMENTS

| | | | |
|---|---|---|---|
| 3,855,536 A | 12/1974 | Neuner | 328/92 |
| 4,421,716 A | * 12/1983 | Hench et al. | 376/216 |
| 5,700,985 A | * 12/1997 | Fischer et al. | 200/50.01 |
| 6,292,523 B1 | 9/2001 | Senechal et al. | 376/259 |

* cited by examiner

Primary Examiner—Jack Keith
(74) Attorney, Agent, or Firm—Armstrong Teasdale LLP

(57) ABSTRACT

A method for operating a system having a plurality of modes and interlocks between the modes is provided. The method includes operating the system in a first mode and switching the system to a second mode without going to a standby mode.

9 Claims, 3 Drawing Sheets

US 6,928,132 B2

METHODS AND APPARATUS FOR OPERATING A SYSTEM

BACKGROUND OF INVENTION

This invention relates generally to apparatus and methods for operating a system and more particularly to apparatus and methods for operating a nuclear reactor.

A typical boiling water reactor (BWR) includes a pressure vessel containing a nuclear fuel core immersed in circulating coolant water that removes heat from the nuclear fuel. The water is boiled to generate steam for driving a steam turbine-generator for generating electric power. The steam is then condensed and the water is returned to the pressure vessel in a closed loop system. A plurality of piping circuits carry steam to the turbines and carry recirculated water or feed water back to the pressure vessel that contains the nuclear fuel.

The BWR includes several conventional closed-loop control systems that control various individual operations of the BWR in response to demands. For example, a control rod drive control system (CRDCS) controls the position of the control rods within the reactor core controling the rod density within the core which determines the reactivity of the core, which in turn determines the output power of the reactor core. A recirculation flow control system (RFCS) controls core flow rate, which changes the steam/water relationship in the core and can be used to change the output power of the reactor core. These two control systems work in conjunction with each other to control, at any given point in time, the output power of the reactor core. A turbine control system (TCS) controls steam flow from the BWR to the turbine based on pressure regulation or load demand.

The operation of these systems, as well as other BWR control systems, is controlled utilizing various monitoring parameters of the BWR. Some monitoring parameters include core flow and flow rate affected by the RFCS, reactor system pressure, which is the pressure of the steam discharged from the pressure vessel to the turbine that can be measured at the reactor dome or at the inlet to the turbine, neutron flux or core power, feed water temperature and flow rate, steam flow rate provided to the turbine and various status indications of the BWR systems. Many monitoring parameters are measured directly, while others, such as core thermal power, are calculated using measured parameters. Outputs from the sensors and calculated parameters are input to an emergency protection system to assure safe shutdown of the plant, isolating the reactor from the outside environment if necessary, and preventing the reactor core from overheating during any emergency event.

An essential requirement of a nuclear reactor protection system is that it must not fail when needed. Therefore, unless the operator promptly and properly identifies the cause of an abnormal transient event in the operation of the reactor, and promptly effects remedial or mitigating action, conventional nuclear reactor protection systems will automatically effect reactor trip. However, it is also essential that reactor trip be avoided when it is not desired or necessary, i.e., when there is an error in the instrumentation or when the malfunction is small enough that reactor trip is unnecessary or when one shutdown function fails, the reactor protection system must not perform the next shutdown function if to do so would be unsafe. Also, at least some known reactors include emergency cooling systems which monitor operation of the reactor.

In the event of an unsafe condition, a shut-down system or a safe operation system can automatically effect remedial action such as changing the reactor valve alignment from a normal operating mode to an emergency operating mode thereby preventing an unsafe or potentially unsafe condition. After the unsafe condition has been resolved, systems are returned to a standby mode and an operator is required to manually align the reactor for other system modes. Operator alignment may result in alignment errors and produce undesirable results. Further, the use of checklists to facilitate system alignment may require two operators to realign the system to a second operating mode.

SUMMARY OF INVENTION

In one aspect, a method for operating a system having a plurality of modes and interlocks between the modes is provided. The method includes operating the system in a first mode and switching the system to a second mode without going to a standby mode.

In another aspect, a method for operating a system having a plurality of modes and interlocks between the modes is provided. The method includes operating the system in a first mode, manually changing the system while operating in the first mode, and re-initializing the system in the first mode without going to a standby mode.

In a further aspect, a system having a plurality of modes and interlocks between the modes is provided. The system includes a computer and a fail safe initiation logic program installed on the computer. The fail safe initiation logic circuit is configured to operate the system in a first mode and switch the system to a second mode without going to a standby mode.

In a still further aspect, a computer readable medium encoded with a program executable by a computer for operating a system having a plurality of modes and interlocks between the modes is provided. The program is configured to instruct the computer to operate the system in a first mode and switch the system to a second mode without going to a standby mode.

DETAILED DESCRIPTION

There is herein provided a formal methodology for implementation of a fail-safe initiation logic instruction set for a power generating system. It is contemplated that the benefits of the present invention accrue to all implementations of power plant safety systems and implementations in non-safety related applications for systems other than power generating systems.

Figure 1:
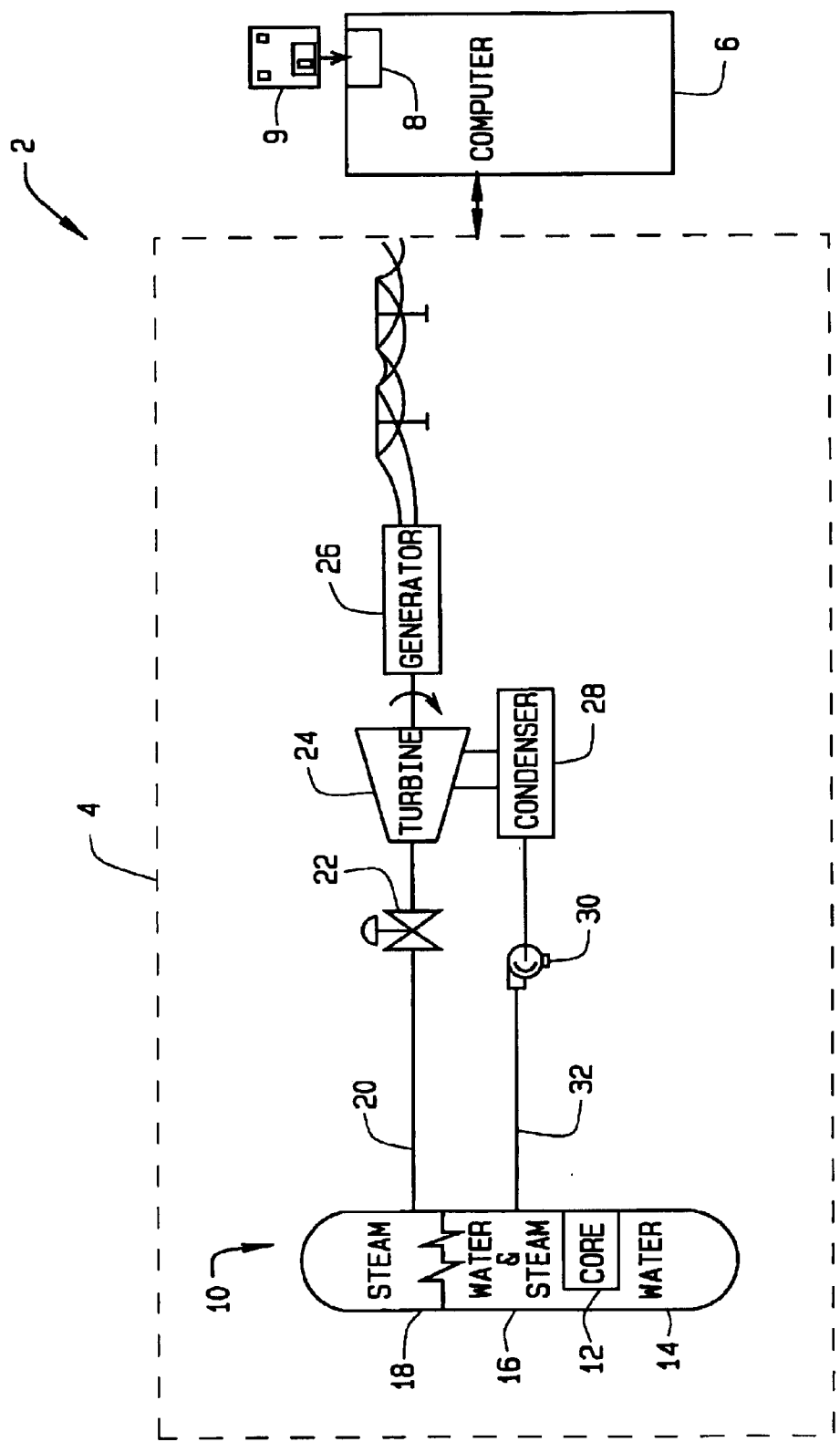
FIG. 1 is an illustration of an exemplary power plant system.

FIG. 1 is an illustration of an exemplary power plant system 2 which includes a generating system 4 and a computer 6. As used herein, the term computer is not limited to just those integrated circuits referred to in the art as computers, but broadly refers to computers, processors, microcontrollers, microcomputers, application specific integrated circuits, and other programmable circuits. In one embodiment, computer 6 includes a device 8 for reading and writing onto a removable media 9. For example, device 8 is a floppy disk drive, a CD-R/W drive, or a DVD drive. Correspondingly, media 9 is either a floppy disk, a compact disk, or a DVD. Device 8 and media 9 are used in one embodiment to input machine readable instructions that are processed by computer 6.

In one embodiment, generating system 4 includes a boiling water nuclear reactor 10 which contains a reactor core 12. Water 14 is boiled using the thermal power of reactor core 12, passing through a water-steam phase 16 to become steam 18. Steam 18 flows through piping in a steam flow path 20 to a turbine flow control valve 22 which controls the amount of steam 18 entering steam turbine 24. Steam 18 is used to drive turbine 24 which in turn drives electric generator 26 creating electric power. Steam 18 flows to a condenser 28 where it is converted back to water 14. Water 14 is pumped by feedwater pump 30 through piping in a feedwater path 32 back to reactor 10. System 4 also includes an emergency core cooling system (ECCS) (not shown) which includes at least one of a residual heat removal (RHR) system, a reactor core isolation cooling (RCIC) system, and a high pressure core flooder (HPCF) system.

Figure 2:
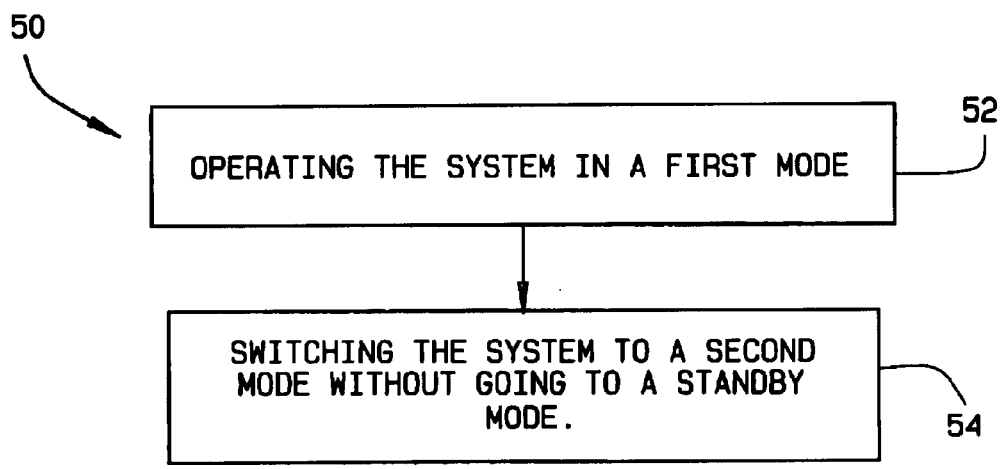
FIG. 2 is a flow chart of a method for operating the system illustrated in FIG. 1.

FIG. 2 is a flow chart of one embodiment of a method 50 for operating system 4 (shown in FIG. 1) that has a plurality of modes and interlocks between the modes. Method 50 includes operating 52 system 4 in a first mode and switching 54 system 4 to a second mode without going to a standby mode using a fail safe initiation logic instruction set 100. In one embodiment, the plurality of modes include modes such as, but not limited to, a residual heat removal mode, a reactor core isolation cooling mode, and a high pressure core flooder mode.

Figure 3:
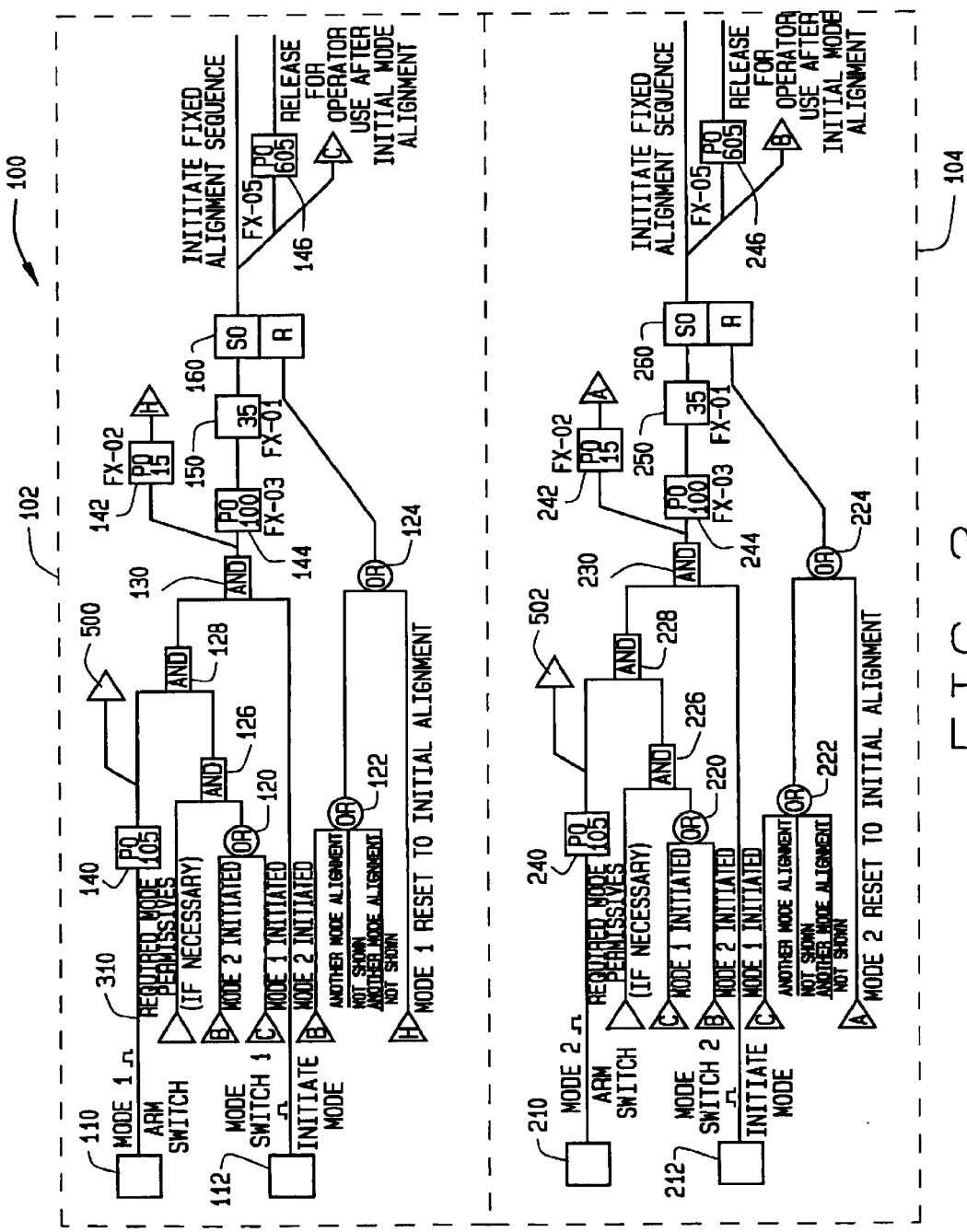
FIG. 3 is a logic diagram of a fail-safe initiation logic instruction set for operating the system illustrated in FIG. 1.

FIG. 3 is a schematic illustration of an exemplary embodiment of a fail-safe initiation logic instruction set 100, installed on computer 6 (shown in FIG. 1) for use with system 4. In an exemplary embodiment, fail-safe initiation logic instruction set 100 is a computer readable medium installed on computer 6 to instruct computer 6 to perform the embodiments described herein.

In one embodiment, fail-safe initiation logic instruction set 100 includes a first logic mode 102 and a second logic mode 104. Alternatively, logic instruction set 100 includes more than two logic modes to align system 4 in a plurality of different configurations as selected by the operator.

First logic mode 102 includes a first mode arm switch 110, a first mode initiate switch 112, a plurality of logic functions, such as, but not limited to, an OR gate 120, an OR gate 122, an OR gate 124, an AND gate 126, an AND gate 128, and an AND gate 130. First logic mode 102 also includes a pulse output timer 140, a pulse output timer 142, a pulse output timer 144, a pulse output timer 146, a delay initiation timer 150, and a flip-flop 160.

Second logic mode 104 includes a second mode arm switch 210, a second mode initiate switch 212, a plurality of logic functions, such as, but not limited to, an OR gate 220, an OR gate 222, an OR gate 224, an AND gate 226, an AND gate 228, and an AND gate 230. Second logic mode 104 also includes a pulse output timer 240, a pulse output timer 242, a pulse output timer 244, a pulse output timer 246, a delay initiation timer 250, and a flip-flop 260.

In one embodiment, flip-flops 160 and 260 are set-override reset (SO, R) flip-flops which allows the set function to override the reset function allowing one permitted mode to drop out from another mode. Pulse output timers 140, 240, 142, 242, 144, and 244 allow a down stream system logic to proceed for a pre-determined time and will reinitiate when permissive logic is removed from an upstream side. When permissive logic is received, delay initiation timers 150 and 250 will delay downstream permissive logic by a pre-determined time, and will reset when the input signal is removed.

By way of illustration only, and not by way of limitation, only two logic modes are illustrated in FIG. 3. In use, an operator selects a desired operational mode to change system 4 current configuration to a pre-determined configuration, such as, but not limited to a Mode One, a Mode Two, and a standby mode. As used herein, mode describes a pre-determined system 4 configuration of such typical system components, including, but not limited to, valves, dampers, motors, and pumps. Standby mode is a term of art in the nuclear field describing plant configurations wherein no power is being generated by a reactor and standby mode refers to an alignment of any system to be dispatched to an operational mode. In other words, standby mode refers to a safe alignment. Interlocking modes describe a plurality of pre-determined system 4 configurations of such typical system components, including, but not limited to, valves, dampers, motors, wherein at least one of the system components in system 4 may be used in a plurality of different system configurations, i.e. the components are connected in such a way that a movement or change in one component causes movement or change in another.

In one embodiment, system 4 is configured in Mode Two and switching 52 system 4 to another mode, such as Mode One, without going to a standby mode includes initializing first mode arm switch 110 to generate an output which is input to pulse output timer 140. In one embodiment, timer 140 is a ten-second timer which delays timer 140 output signal to AND gate 128. Pulse output timer 140 allows a logic instruction set 100 to generate an error message, such as, but not limited to, Initiation not allowed in Not Permitted Mode. For approximately ten seconds, pulse output timer 140 output signal is input to AND gate 128. In one embodiment, if system 4 is in Mode Two, a Mode Two initiated signal is input to OR gate 120 and OR gate 122. OR gate 120 output is then input to AND gate 126. OR gate 122 output is input to OR gate 124 which is then input to flip-flop 160 for reset. First logic mode 102 also determines whether the pre-determined permissives have been met. If the pre-determined permissives for the Mode One have been met, then a signal is input to AND gate 126 and ANDED with OR gate 120 output. Alternatively, if the pre-determined permissives for Mode One have not been met then no signal is input to AND gate 126. AND gate 126 output and timer 140 output are input to AND gate 128 which is then output to AND gate 130. When first mode initiate switch 112 is initialized, first mode initiate switch 112 output and AND gate 128 output are ANDED" by AND gate 130 which is then output to pulse output timer 142 and pulse output timer 144.

In one embodiment, pulse output timer 142, pulse output timer 144, and delay initiation timer 150 allow the mode to be reset. Additionally, timer 144, in conjunction with flip-flop 160, allow multiple mode resets, i.e. timer 144 holds flip-flop 160 in the set-override position until other modes, i.e. mode 2 initiate signal input from OR gate 124, are reset which drops out the reset command to the selected mode, i.e. Mode 1. In use, timer 142 is only required if the mode is allowed to re-initialize itself and pulse output timer 144 will hold an initiation signal for delay initiation timer 150. Pulse output timer 142 will drop out after a pre-determined time for test. In one embodiment, pulse output timer 144 includes a delay time which is greater than pulse output timer 142 delay time. Flip-flop 160 output is then used to actuate at least one pre-determined system 4 component from a first position or state to a second position or state. Pulse output timer 150 then drops out to allow the operator to either re-initialize Mode 1 or switch to another mode such as Mode 2 without going to a standby mode.

If system 4 is configured in Mode One and the operator has manually realigned a component in system 4, Mode One can be re-initialized. In this case, pulse output timer 142 output is input to OR gate 124 which is input to flip-flop 160. Pulse output timer 144 holds the initiation signal for delay initiation timer 150 allowing pulse output timer 142 output to reset flip-flop 160 and allows re-initializing Mode One.

In another embodiment, system 4 is configured in Mode One and switching 52 system 4 to another mode, such as Mode Two, without going to a standby mode includes initializing second mode arm switch 210 which is input to pulse output timer 240. In one embodiment, pulse output timer 240 is a ten-second timer which delays dropping out the output signal. Pulse output timer 240 delay allows a logic instruction set 100 to generate an error message, such as, but not limited to, Initiation not allowed in Not Permitted Mode. For approximately ten seconds, pulse output timer 240 output signal is input to AND gate 228. In one embodiment, if system 4 is in Mode One, a Mode One initiated signal is input to OR gate 220 and OR gate 222. OR gate 220 output is then input to AND gate 226. OR gate 222 output is input to OR gate 224 which is then input to flip-flop 260 for reset. Second logic mode 104 also determines whether the pre-determined permissives have been met. If the pre-determined permissives for the Mode Two have been met, then a signal is input to AND gate 226 and ANDED with OR gate 220 output. Alternatively, if the pre-determined permissives for Mode Two have not been met then no signal is input to AND gate 226. AND gate 226 output and timer 240 output are input to AND gate 228 which is then output to AND gate 230. When second mode initiate switch 212 is initialized, second mode initiate switch 212 output and AND gate 228 output are ANDED" by AND gate 230 which is then output to pulse output timer 242 and pulse output timer 244.

In one embodiment, pulse output timer 242, pulse output timer 244, and delay initiation timer 250 allow the mode to be reset. Additionally, timer 244, in conjunction with flip-flop 260, allow multiple mode resets, i.e. timer 244 holds flip-flop 260 in the set-override position until other modes, i.e. Mode One initiate signal input from OR gate 224, are reset which drops out the reset command to the selected mode, i.e. Mode Two. In use, timer 242 is only required if the mode is allowed to re-initialize itself, in which case pulse output timer 244 will hold an initiation signal for delay initiation timer 250. Pulse output timer 242 will drop out after a pre-determined time for reset. In one embodiment, pulse output timer 244 includes a delay time which is greater than pulse output timer 242 delay time. Flip-flop 260 output is then used to actuate at least one pre-determined system 4 component from a first position or state to a second position or state. Delay initiation timer 250 then allows either re-initialize Mode Two or switch to another mode such as Mode One without going to a standby mode.

Additionally, if system 4 is configured in Mode Two and the operator has manually changed a system 4 component, Mode Two can be re-initialized. In this case, pulse output timer 242 output is input to OR gate 224 which is input to flip-flop 260 reset. Pulse output timer 244 holds the initiation signal for delay initiation timer 250 allowing pulse output timer 242 output to initialize flip-flop 260 and allow re-initializing Mode Two.

While the invention has been described in terms of various specific embodiments, those skilled in the art will recognize that the invention can be practiced with modification within the spirit and scope of the claims.

What is claimed is:

1. A method for operating a system that includes a plurality of valves, dampers, motors, and pumps, the system is operable in a plurality of operating modes that each include interlocks between the modes, said method comprising:

operating the system in a first operating mode, the first operating mode comprising a predetermined configuration of valves, dampers, motors, and pumps;

selecting a second operating mode to switch the system operation to;

receiving a signal indicative of the system meeting permissive requirements for entering the selected mode;

initiating a predetermined time delay greater than zero time;

resetting the selected operating mode during the time delay; and switching the system to a second operating mode without going to a standby mode, the second operating mode comprising a predetermined configuration of valves, dampers, motors, and pumps different than the first mode, and wherein at least one of the valves, dampers, motors, or pumps is positioned to a different operating position in the second operating mode than that respective valve, damper, motor, or pump was positioned for operation during the first operating mode.

2. A method in accordance with claim 1 wherein switching the system to a second mode comprises switching the system to a second mode without going to a standby mode, at least one of the first mode and the second mode comprises at least one of a residual heat removal mode, a reactor core isolation cooling mode, and a high pressure core flooder mode.

3. A method in accordance with claim 1 further comprising verifying a plurality of second mode permissives prior to switching the system to the second mode.

4. A method in accordance with claim 1 wherein switching the system to a second mode without going to a standby mode comprises switching the system to a second mode using a fail safe initiation logic program.

5. A method for operating a nuclear power plant system that is operable in a plurality of operating modes that each include interlocks between the modes, said method comprising:

operating the system in a first operating mode, the first operating mode comprising a predetermined configuration of valves, dampers, motors, and pumps;

selecting a second operating mode to switch the system operation to;

receiving a signal indicative of the system meeting permissive requirements for entering the selected mode;

initiating a predetermined time delay greater than zero time;

resetting the selected operating mode during the time delay; and switching the system to a second operating mode without going to a standby mode, the second operating mode comprising a predetermined configuration of valves, dampers, motors, and pumps different than the first operating mode, and wherein at least one of the valves, dampers, motors, or pumps is positioned to a different operating position in the second operating mode than that respective valve, damper, motor, or pump was positioned for operation during the first operating mode.

6. A method in accordance with claim 5 wherein switching the system to a second mode comprises switching the system to a second mode without going to a standby mode, at least one of the first mode and the second mode comprises at least one of a residual heat removal mode, a reactor core isolation cooling mode, and a high pressure core flooder mode.

7. A method in accordance with claim 5 further comprising manually changing at least one valve, damper, motor, or pump while operating in the first mode.

8. A method in accordance with claim 5 further comprising verifying a plurality of second mode permissives prior to switching the system to the second mode.

9. A method in accordance with claim 5 wherein switching the system to a second mode without going to a standby mode comprises switching the system to a second mode using a fail safe initiation logic program.

* * * * *